US011547132B2

(12) United States Patent
Yin et al.

(10) Patent No.: US 11,547,132 B2
(45) Date of Patent: Jan. 10, 2023

(54) METHOD AND COOKING APPARATUS FOR CONTROLLING A FOOD COOKING PROCESS

(71) Applicant: KONINKLIJKE PHILIPS N. V., Eindhoven (NL)

(72) Inventors: Bin Yin, Eindhoven (NL); Declan Patrick Kelly, Eindhoven (NL); Qing Li, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 91 days.

(21) Appl. No.: 15/305,679

(22) PCT Filed: Apr. 21, 2015

(86) PCT No.: PCT/EP2015/058604
§ 371 (c)(1),
(2) Date: Oct. 21, 2016

(87) PCT Pub. No.: WO2015/162131
PCT Pub. Date: Oct. 29, 2015

(65) Prior Publication Data
US 2017/0042202 A1 Feb. 16, 2017

(30) Foreign Application Priority Data

Apr. 23, 2014 (WO) ................ PCT/CN2014/000436
May 30, 2014 (EP) .................................... 14170702

(51) Int. Cl.
*A23L 5/10* (2016.01)
*A47J 36/32* (2006.01)

(52) U.S. Cl.
CPC ................. *A23L 5/10* (2016.08); *A47J 36/32* (2013.01); *A23V 2002/00* (2013.01)

(58) Field of Classification Search
CPC ......... A23L 5/10; A23L 5/00; A23V 2002/00; A47J 27/002; A47J 36/00; A47J 31/5253;
(Continued)

(56) References Cited

U.S. PATENT DOCUMENTS 3,972,275 A 8/1976 Schweig
4,370,535 A * 1/1983 Noda ..................... G01K 3/005
219/703

(Continued)

FOREIGN PATENT DOCUMENTS

EP 0701387 A2 3/1996
JP H09-119649 A 5/1997
(Continued)

OTHER PUBLICATIONS

Confidence interval definition NPL: https://www.itl.nist.gov/div898/handbook/prc/section1/prc14.htm.*
(Continued)

*Primary Examiner* — Drew E Becker
(74) *Attorney, Agent, or Firm* — Schott, P.C.

(57) ABSTRACT

The present invention relates to a method and a cooking apparatus for controlling a process for cooking food. The method comprises the steps of: detecting an initial temperature of the food; evaluating weighting factors of more than one temperature ranges according to the initial temperature, the more than one temperature ranges and preset cooking parameters of each of the more than one temperature ranges being predetermined; and controlling the cooking process based on the evaluated weighting factors and the preset cooking parameters. With this configuration, the cooking setting (temperature, time etc) can thus be determined based on the detected temperature ranges as well as the eliminated temperature ranges, so that possible detection inaccuracy can be eliminated to a large extent.

18 Claims, 2 Drawing Sheets

(58) Field of Classification Search
CPC ........ A47J 36/32; H05B 6/645–6/6458; F24C 3/12–3/128; F24C 7/08–7/088
See application file for complete search history.

(56) References Cited

U.S. PATENT DOCUMENTS

| | | | |
|---|---|---|---|
| 4,375,131 A | 3/1983 | Jarman | |
| 4,376,131 A * | 3/1983 | Mori | G01N 33/02 426/523 |
| 4,841,111 A * | 6/1989 | Kokkeler | H05B 6/6411 219/703 |
| 4,884,626 A * | 12/1989 | Filipowski | F25D 23/12 165/265 |
| 4,898,741 A * | 2/1990 | Heide | A23B 4/07 426/524 |
| 5,558,797 A * | 9/1996 | Takagi | H05B 6/6482 219/710 |
| 5,681,496 A | 10/1997 | Brownlow | |
| 5,693,247 A * | 12/1997 | Bu | H05B 6/6455 374/149 |
| 5,827,556 A | 10/1998 | Maher, Jr. | |
| 5,843,505 A * | 12/1998 | Davidson | A23B 5/005 426/298 |
| 6,410,066 B1 * | 6/2002 | Weng | A23L 3/003 426/231 |
| 7,102,107 B1 * | 9/2006 | Chapman | F24C 7/082 219/710 |
| 7,501,608 B2 | 3/2009 | Hallgren | |
| 8,344,294 B2 | 1/2013 | Greiner | |
| 2003/0139843 A1 | 7/2003 | Hu | |
| 2006/0049187 A1 * | 3/2006 | Jurgens | F24C 7/08 219/710 |
| 2010/0006558 A1 * | 1/2010 | McLoughlin | F24C 7/08 219/392 |
| 2012/0100269 A1 * | 4/2012 | Polt | G01K 3/04 702/136 |

FOREIGN PATENT DOCUMENTS

| | | |
|---|---|---|
| JP | 2001-033041 A | 2/2001 |
| JP | 2002-181336 A | 6/2002 |
| JP | 2009-054042 A | 3/2009 |
| JP | 2012-217601 A | 11/2012 |

OTHER PUBLICATIONS

Detecting Cooking State with Gas Sensors During Dry Cooking Sen H. Hirano, Jed R. Brubaker, Donald J. Patterson, Gillian R. Hayes Department of Informatics University of California, Irvine shirano@ics.uci.edu, jrbrubak@ics.uci.edu, djp3@ics.uci.edu, gillianrh@ics.uci.edu 2013.

* cited by examiner

METHOD AND COOKING APPARATUS FOR CONTROLLING A FOOD COOKING PROCESS

This application is the U.S. National Phase application under 35 U.S.C. § 371 of International Application No. PCT/EP2015/058604, filed on Apr. 21, 2015, which claims the benefit of International Application No. 14170702.6 filed on May 30, 2014 and International Application No. PCT/CN2014/000436 filed Apr. 23, 2014. These applications are hereby incorporated by reference herein.

FIELD OF THE INVENTION

The invention relates to a method and a cooking apparatus for controlling a process for cooking food. In particular, it relates to a method and an apparatus for controlling a cooking process according to an evaluated status of the food.

BACKGROUND OF THE INVENTION

Automated cooking apparatus save users hassle in the kitchen, bring convenience to users, and at the same time guarantee consistent cooking results. A fully automated cooking apparatus requires little user intervention other than the user placing the food in the apparatus, choosing a desired cooking result (doneness) and pushing the start button.

Food of different initial status (i.e., initial temperature), such as frozen or non-frozen, may require very different cooking settings, to achieve optimal cooking results (texture, moisture etc). Therefore, the apparatus needs information about the food's initial status (amount, frozen or non-frozen etc), in order to determine a cooking strategy suitable for the food in question having a specific initial status, which is an important part of the automation. This information is currently provided by a user through manual input, which brings inconvenience especially to the non-experienced user, and which also leaves room for human errors. For instance, the user takes a bag of French fries out of the freezer, and leaves it at room temperature for 20 minutes, to finish other tasks, before starting the frying. The fries may be well above 0° C. at the surface but still frozen inside, which makes the definition of their status a tricky task.

SUMMARY OF THE INVENTION

In order to address the above and other potential problems, embodiments of the present invention propose a method and an apparatus for controlling a process for cooking food.

It is advantageous to provide a method and a cooking apparatus capable of determining cooking settings, in which the food's initial status is automatically detected, and the detection as well as the cooking setting determination are designed in such a manner that the method is robust against possible detection ambiguity.

The invention is defined by the independent claims. The dependent claims define advantageous embodiments.

For this purpose, an embodiment of the invention provides a method of controlling a process for cooking food, the method comprising the steps of: detecting an initial temperature of the food; evaluating weighting factors of more than one temperature ranges according to the initial temperature, the more than one temperature ranges and preset cooking parameters of each of the more than one temperature ranges being predetermined; and controlling the cooking process based on the evaluated weighting factors and the preset cooking parameters.

The cooking setting determination is characterized in that it does not solely rely on the single temperature range obtained straight from the detection step, but also takes account of the other temperature ranges, and therefore determines the cooking parameters jointly, while considering their different confidence indices in the detection step. This serves, on the one hand, to tackle the ambiguity issue of the food's initial status mentioned above, and on the other hand, to alleviate the impact of possible detection inaccuracy on the cooking outcome, due to various disturbing factors which in practice may come on top of the status ambiguity.

In a preferred embodiment of the invention, the more than one temperature ranges are continuous without overlap. With such a configuration, the more than one temperature ranges are able to cover most of the possible initial temperatures of the food.

Preferably, the step of controlling comprises: calculating the product of each preset cooking parameter and a corresponding evaluated weighting factor; and controlling the cooking process by summation of the calculated products.

By calculating the product of each preset cooking parameter and a corresponding evaluated weighting factor, the preset cooking settings corresponding to more than one temperature ranges contribute to the final cooking setting, which all have likelihood of being the actual one above a pre-defined threshold. It alleviates the consequence of improper categorization, compared to a 'hard' determination method where a determined cooking setting can be significantly off if an incorrect range is chosen.

Preferably, the step of controlling comprises assigning different numerical values to the more than one temperature ranges; calculating the product of each numerical value and a corresponding evaluated weighting factor; and controlling the cooking process by summation of the products and a continuous cooking parameter function with respect to temperature.

Based on this, the desired cooking setting parameters can be determined with a continuous function of the food temperature range, wherein the food temperature range is defined by a numerical value. It also alleviates the consequence of improper categorization, compared to a 'hard' determination method where a determined cooking setting can be significantly off if an incorrect range is chosen.

In a preferred embodiment of the invention, prior to the step of controlling, the method further comprises: generating the continuous cooking parameter function with respect to temperature based on the preset cooking parameters and the more than one temperature ranges.

Preferably, the step of controlling comprises controlling at least one of: cooking temperature, cooking time, cooking humidity and cooking pressure during the cooking process.

In another preferred embodiment of the invention, at least one of the more than one temperature ranges is above 0° C. Fewer ranges lead to fewer detection errors, but can result in a substantial deviation from the desired cooking doneness when a detection error occurs. Therefore, by predetermining more than one temperature ranges above 0° C., more accurately evaluated weighting factors and thus an optimal cooking setting parameter can be achieved.

Preferably, the step of detecting further comprises: measuring the initial temperature of the food based on the moisture loss rate of the food during the cooking process. By means of the moisture loss rate of the food, the initial temperature of the food can be detected more precisely, since the moisture loss rate is linked closely to the temperature of the food, especially when the temperature of the food is above 0° C.

The invention also proposes a cooking apparatus for controlling the process for cooking food, the cooking apparatus comprising: a detecting unit for detecting an initial temperature of the food; an evaluating unit for evaluating weighting factors of more than one temperature ranges according to the initial temperature, the more than one temperature ranges and preset cooking parameters of each of the more than one temperature ranges being predetermined; and a controlling unit for controlling the cooking process based on the evaluated weighting factors and the preset cooking parameters.

The cooking setting (temperature, time etc) can thus be determined based on the detected temperature ranges as well as the eliminated temperature ranges. This will tackle the ambiguity issue of the food's initial status mentioned above, and alleviate the impact of possible detection inaccuracy on the cooking outcome as well.

Preferably, the more than one temperature ranges are continuous without overlap. With such a configuration, the more than one temperature ranges are able to cover most of the possible initial temperatures of the food.

In a preferred embodiment of the invention, the controlling unit is further configured for: calculating the product of each preset cooking parameter and a corresponding evaluated weighting factor; and controlling the cooking process by summation of the calculated products.

By calculating the product of each preset cooking parameter and a corresponding evaluated weighting factor, the preset cooking settings corresponding to more than one temperature ranges contribute to the final cooking setting, which all have likelihood of being the actual one above a pre-defined threshold. It alleviates the effect of improper categorization, compared to a 'hard' determination method where a determined cooking setting can be significantly off if an incorrect range is chosen.

Preferably, the controlling unit is further configured for: assigning different numerical values to the more than one temperature ranges; calculating the product of each numerical value and a corresponding evaluated weighting factor; and controlling the cooking process by summation of the products and a continuous cooking parameter function with respect to temperature.

Based on this, the desired cooking setting parameters can be determined with a continuous function of the food temperature range, wherein the food temperature range is defined by a numerical value. It also alleviates the consequence of improper categorization, compared to a 'hard' determination method where a determined cooking setting can be significantly off if an incorrect range is chosen.

In another preferred embodiment of the invention, the controlling unit is configured for controlling at least one of: cooking temperature, cooking time, cooking humidity and cooking pressure during the cooking process.

Preferably, at least one of the more than one temperature ranges is above 0° C. Fewer ranges lead to fewer detection errors, but can result in a substantial deviation from the desired cooking doneness when a detection error occurs. Therefore, by predetermining more than one temperature ranges above 0° C., more accurately evaluated weighting factors and thus an optimal cooking setting parameter can be achieved.

Preferably, the detecting unit is configured for: measuring the initial temperature of the food based on the moisture loss rate of the food during the cooking process. By means of measuring the moisture loss rate of the food, the initial temperature of the food can be detected more precisely, since the moisture loss rate is linked closely to the temperature of the food, especially when the temperature of the food is above 0° C.

These and other aspects of the invention will be apparent from and elucidated with reference to the embodiments described hereinafter. However, the invention is not limited to these exemplary embodiments.

BRIEF DESCRIPTION OF THE DRAWINGS

The present invention will now be described based on various embodiments with reference to the accompanying drawings, in which.

DETAILED DESCRIPTION OF EMBODIMENTS

Figure 1:
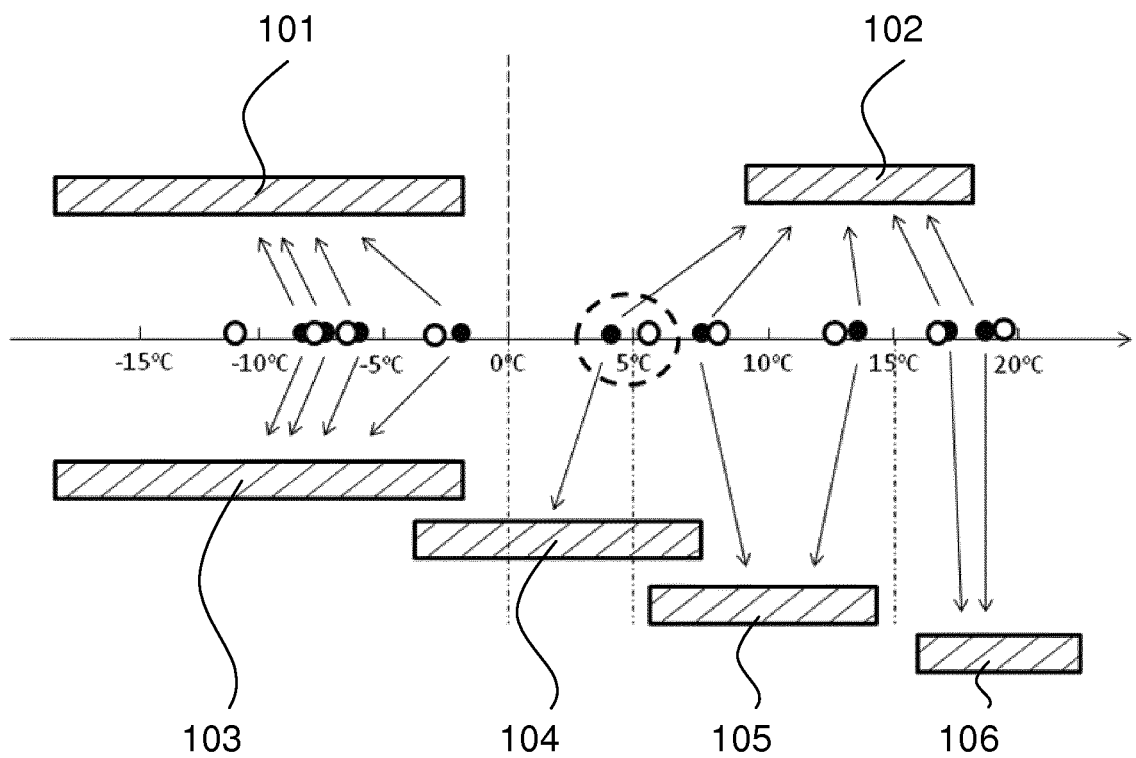
FIG. 1 illustrates a comparison between binary and quadruple temperature categorizations.

Reference will now be made to embodiments of the disclosure, one or more examples of which are illustrated in the figures. The embodiments are provided by way of explanation of the disclosure, and are not meant as a limitation of the disclosure. For example, features illustrated or described as part of one embodiment may be used with another embodiment to yield a still further embodiment. It is intended that the disclosure encompass these and other modifications and variations as come within the scope and spirit of the disclosure.

According to an embodiment of the invention, a method of controlling a process for cooking food comprises the steps of: detecting an initial temperature of the food; evaluating weighting factors of more than one temperature ranges according to the initial temperature, the more than one temperature ranges and preset cooking parameters of each of the more than one temperature ranges being predetermined; and controlling the cooking process based on the evaluated weighting factors and the preset cooking parameters.

The cooking setting determination is characterized in that it does not solely rely on the single temperature range obtained straight from the detection step, but also takes account of the other temperature ranges, and therefore determines the cooking parameters jointly, while considering their different confidence indices in the detection step. The cooking setting (temperature, time etc) can thus be determined based on the detected temperature ranges as well as the eliminated temperature ranges. This is used, on the one hand, to tackle the ambiguity issue of the food's initial status mentioned above, and, on the other hand, to alleviate the impact of possible detection inaccuracy on the cooking outcome due to various disturbing factors which in practice may come on top of the status ambiguity.

In a preferred embodiment of the invention, the more than one temperature ranges are continuous without overlap. With such a configuration, the more than one temperature ranges are able to cover most of the possible initial temperatures of the food.

Preferably, the step of controlling comprises: calculating the product of each preset cooking parameter and a corresponding evaluated weighting factor; and controlling the cooking process by summation of the calculated products.

By calculating the product of each preset cooking parameter and a corresponding evaluated weighting factor, the preset cooking settings corresponding to more than one temperature ranges contribute to the final cooking setting, which all have likelihood of being the actual one above a pre-defined threshold. It alleviates the effect of improper categorization, compared to a 'hard' determination method where a determined cooking setting can be significantly off if an incorrect range is chosen.

Preferably, the step of controlling comprises assigning different numerical values to the more than one temperature ranges; calculating the product of each numerical value and a corresponding evaluated weighting factor; and controlling the cooking process by summation of the products and a continuous cooking parameter function with respect to temperature.

Based on this, the desired cooking setting parameters can be determined with a continuous function of the food temperature range, wherein the food temperature range is defined by a numerical value. It also alleviates the effect of improper categorization, compared to a 'hard' determination method where a determined cooking setting can be significantly off if an incorrect range is chosen.

In a preferred embodiment of the invention, prior to the step of controlling, the method further comprises: generating the continuous cooking parameter function with respect to temperature based on the preset cooking parameters and the more than one temperature ranges. Such a configuration makes the continuous cooking parameter function more specific with respect to the type of food.

Preferably, the step of controlling comprises controlling at least one of: cooking temperature, cooking time, cooking humidity and cooking pressure during the cooking process.

As can be understood by those skilled in the art, a cooking setting comprises at least one of: cooking temperature, cooking time, cooking humidity and cooking pressure during the cooking process. The cooking setting can thus be determined according to the method of the various embodiments of the invention and is also based on the particular setting of the cooking apparatus in use.

In another preferred embodiment of the invention, at least one of the more than one temperature ranges is above 0° C. As will be discussed in detail below, fewer ranges lead to fewer detection errors, but can result in a substantial deviation from the desired cooking doneness when a detection error occurs. Therefore, by predetermining more than one temperature ranges above 0° C., more accurately evaluated weighting factors and thus an optimal cooking setting parameter can be achieved.

Preferably, the detecting step further comprises: measuring the initial temperature of the food based on the moisture loss rate of the food during the cooking process. By means of measuring the moisture loss rate of the food, the initial temperature of the food can be detected more precisely, since the moisture loss rate is linked closely to the temperature of the food, especially when the temperature of the food is above 0° C.

The food's initial temperature may be detected by any method that is low-cost, reliable and easy to integrate into a cooking apparatus. A preferred method is to measure the moisture loss (rate) of the food during heating, which is very well related to the actual initial temperature of the food, under a same heating condition (device and/or temperature). Those skilled in the art can understand that other suitable methods can also be applied for detecting the initial temperature of the food.

Detected initial temperatures can be of a continuous or discrete nature. In some cases, a numeric temperature value is provided, for instance, −2° C. or 15° C.; whereas in other cases, a temperature range is given, for example frozen or non-frozen. Food in a certain temperature range may be defined by an (average) temperature interval of the food.

In practice, the definition of the food's initial status may become ambiguous. For instance, the user takes a bag of French fries out of the freezer, and leaves it at room temperature for 20 minutes, to finish other tasks, before starting the actual frying. As a the fries are well above 0° C. at the surface but still frozen inside. Categorization into frozen or non-frozen may be improper decisions and may therefore lead to non optimal frying results.

To cope with this issue, in addition to frozen and non-frozen, additional or finer initial status levels are predetermined. Below is an example of French fries where 4 initial temperature ranges are predetermined:

1. Frozen: surface and core temperature below 0° C., thus average temperature $T_{avg}<0°$ C.
2. Partially defrosted: still frozen inside, but average temperature $0°$ C.$<T_{avg}\leq 5°$ C.
3. Defrosted but cold: inside defrosted, average temperature $5°$ C.$<T_{avg}\leq 15°$ C.
4. Room temperature: average temperature $T_{avg}>15°$ C.

It should be understood by those skilled in the art that although 4 initial temperature ranges are predetermined in the example, more or fewer temperature ranges are still applicable for the methods of various embodiments of the invention.

Categorization of the detected initial temperature can be realized in two ways:

Establishing a model (e.g., by regression) that predicts the food's initial temperature, as a numerical value, based on measured data, and then translating it to a temperature range according to the predetermined temperature ranges.

Establishing a classifier that links one or more features extracted from the measured data directly to a temperature range.

Once the food's initial status is categorized, a cooking setting (temperature, time, humidity etc) for this range is determined. Also, cooking settings for particular temperature ranges can be pre-stored in the cooking apparatus. The cooking settings or the rules for determining cooking settings usually differ per food type. They can be established experimentally for all food types of interest and pre-stored in the apparatus prior to actual use. The cooking setting determination is characterized in that it does not solely rely on the single temperature range obtained straight from the detection step, but also takes account of the other temperature ranges, and therefore determines the cooking parameters jointly, while considering their different confidence indices in the detection step.

The actual number of temperature ranges is food type dependent. In general, fewer ranges (thus fewer boundaries) means fewer detection errors, but can result in a substantial deviation from the desired cooking doneness when a detection error occurs, due to a relatively large cooking setting difference for foods in these ranges; conversely, more ranges (finer temperature resolution) often means a lower detection accuracy (due to more boundaries), but more ranges likely have a minor impact on the cooking doneness since improper categorization of temperature ranges happens mostly between neighboring ones that use very similar cooking settings. A good choice of the number of temperature ranges results in a balance between detection accuracy and a satisfactory cooking outcome.

A comparison between binary and quadruple temperature categorizations is shown in FIG. 1, where the binary temperature categorization predetermines only "frozen" and "non-frozen" statuses (as indicated with bars 101 and 102 in the top half of FIG. 1). The lengths of the bars 101 and 102 represent average cooking time for food initially of frozen and non-frozen statuses, respectively. The quadruple temperature categorization predetermines "partially defrosted", "defrosted but cold" and "room temperature" within the non-frozen range, and "frozen" as well (as indicated with bars 104, 105, 106 and 103 respectively in the bottom half of FIG. 1). Also, the lengths of the bars 103, 104, 105 and 106 represent average cooking time for food initially of one of these four statuses, respectively. Filled circles indicate actual (average) food initial temperatures and hollow ones indicate detected initial temperatures.

In the binary case, there is no detection error, but a same average cooking time is applied to all non-frozen food samples whose temperatures are scattered between 5° C. and 20° C., which is definitely not optimal.

In the quadruple case, the non-frozen samples get different cooking time settings according to the temperature ranges they belong to, which are more finely predetermined. There is one detection error, i.e., the sample in the 'partially defrosted' range is categorized into the 'defrosted but cold' range (marked by the dashed line circle). The designated cooking time is shorter than it should be, but the consequence is not worse than in the binary case.

Figure 2:
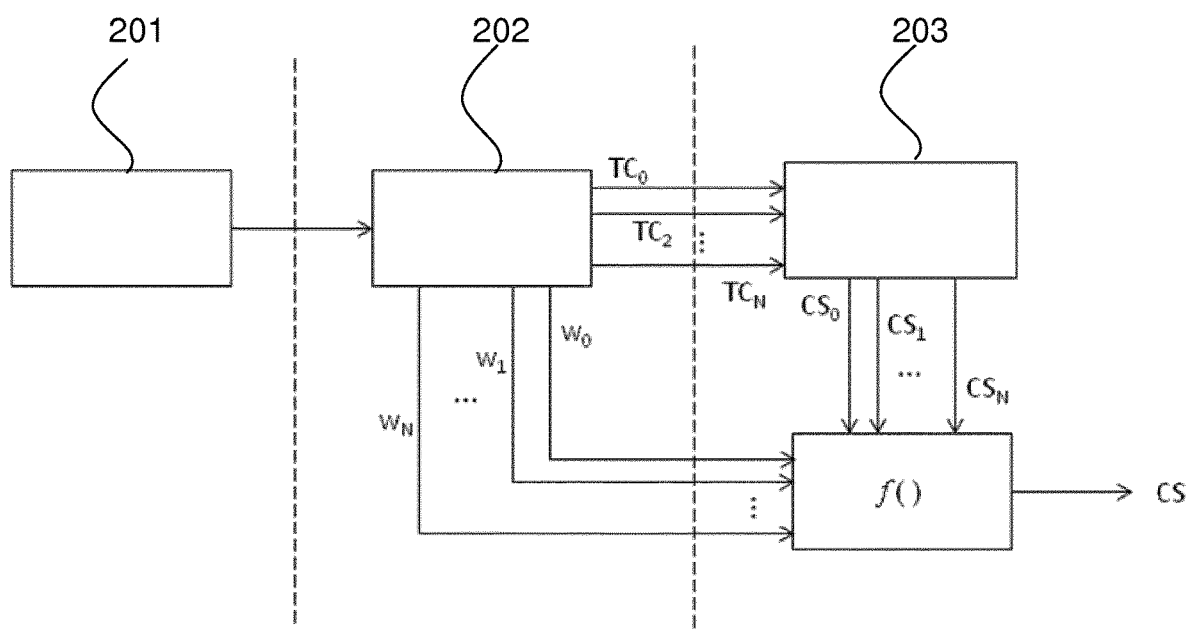
FIG. 2 illustrates a block diagram of the method according to an embodiment of the invention.

In FIG. 2, a block diagram illustrates how a method according to an embodiment of the invention is deployed. It basically consists of three steps: data measurement 201 (i.e., detecting an initial temperature of the food), temperature range categorization 202 and cooking setting determination, wherein the cooking setting determination can optionally be implemented using a database of cooking settings 203 and a function $f(\ )$. The notations in the diagram will be explained in the following detailed description.

To further reduce negative effects on the cooking outcome due to improper categorization, the determination is made not solely based on the single temperature range resulting from the detection step, but also takes account of the other ranges eliminated in the categorization. This can be realized at two levels as explained below.

Soft Determination at the Cooking Setting Level

The determination can be described by a function $f(\ )$ as follows:

$$CS=f(CS_0, w_1CS_1, w_2CS_2, \ldots, w_N CS_N), N<N_{TC} \quad (1)$$

where CS represents the resultant cooking setting, $CS_i$ ($i=0, 1, \ldots, N$) are the cooking settings corresponding to individual temperature ranges, $w_i$ ($i=1, 2, \ldots, N$) are the weighting factors with $$1 > w_1 \geq w_2 \geq \ldots \geq w_N > 0, \quad (2)$$

and $N_{TC}$ is the total number of predetermined temperature ranges. In particular, $CS_0$ is the cooking setting for the categorized temperature range, and $CS_i$ ($i=1, 2, \ldots, N$) are the cooking settings for a selected set of categorized temperature ranges, wherein $CS_0$ and $CS_i$ ($i=1, 2, \ldots, N$) can be pre-stored in a database.

The equation (1) can be implemented by the following steps:
1. Calculating confidence indices during categorization for each of the $N_{TC}$ temperature ranges, and sorting them in a descending order;
2. Taking the first N+1 confidence indices (normalized with respect to the first one);
3. Taking the cooking settings corresponding to these N+1 temperature ranges;
4. Determining a cooking setting (time, temperature etc) by combining the N+1 cooking settings using (a function of) the confidence indices as weighting factors.
   An example of the function $f(\ )$ is a weighted summation, such as $$CS = CS_0 + \Sigma_{i=1}^N w_i CS_i \quad (3)$$

in which the cooking setting parameters $CS_0$ and $CS_i$ can be cooking temperature T or time t.

In equation (1), a weighting factor $w_0$ can be also defined for $CS_0$. In this case, the summation of all weighting factors is normalized to be one, i.e., $$\sum_{i=0}^{N} w_i = 1.$$

With this 'soft' determination, cooking settings corresponding to more than one temperature ranges contribute to the final cooking setting, which all have likelihood of being the actual one above a pre-defined threshold. It alleviates the effect of improper categorization, compared to a 'hard' determination method where a determined cooking setting can be significantly off if an incorrect range is chosen.

An example:

Let us assume that the French fries in question have different frying times for different initial statuses as shown in Table 1.

TABLE 1

Frying time of French fries at different initial temperature statuses (500 g, heating at 200° C.)

| | Temperature range | | | |
|---|---|---|---|---|
| | Frozen | Partially defrosted | Defrosted but cold | Room temperature |
| Frying time (min) | 18 | 16 | 14.5 | 13 |

The tested French fries, in the 'partially defrosted' range, are categorized as
  'frozen': probability 0.04;
  'partially defrosted': probability 0.45;
  'defrosted but cold': probability 0.50 (which will be considered as the result of a hard decision based on the maximum probability);
  'room temperature': probability 0.01.

That is, in the context of the present invention, the weighting factors of the more than one temperature ranges can be evaluated according to the probability that the actual initial temperature belongs to each of the more than one temperature ranges. In this way, the measured initial temperature can be used to evaluate the actual initial temperature of the food with a minimum error.

With the soft determination method (weighted summation, equation (3)), the cooking time is calculated as follows:

$$CS=14.5*0.5+18*0.04+16*0.45+13*0.01=15.3 \text{ minutes},$$

whereas the hard decision categorizes improperly and results in a cooking time of 14.5 minutes. Compared to the correct cooking time of 16 minutes, the soft determination yields a better result.

Confidence indices are calculated differently depending on the classifier type used. For instance, a Bayesian classifier calculates the conditional probability that a food's initial status belongs to one temperature range, given measured moisture loss characteristics. The temperature range that has the largest conditional probability is selected. The conditional probability, or a function of it, can be taken as the confidence index. For a decision tree, categorization accuracy at each decision node in the training can be defined as the confidence index.

Soft Determination at the Temperature Range Level

An in-between temperature range is calculated when soft determination is performed at the temperature range level. In this case, numerical values are assigned to the predetermined temperature ranges, for instance, 1 for 'frozen', 2 for 'partially defrosted', 3 for 'defrosted but cold' and 4 for 'room temperature'. A soft decision on temperature range is given by $$TC=f(TC_0, w_1 TC_1, w_2 TC_2, \ldots, w_N TC_N), N<N_{TC} \quad (4)$$

wherein TC denotes an evaluated temperature, typically a numerical value, and the rest is defined in the same manner as in (1) and (2). A simple form of equation (4) is a weighted summation, written as $$TC=TC_0+\Sigma_{i=1}^{N} w_i TC_i. \quad (5)$$

For instance, when a food sample is at 12° C. (in range 3 but close to range 4), a soft decision made by equation (5) may give a value of 3.2. Similarly, in equation (4), a weighting factor $w_0$ can be also defined for $TC_0$. In this case, the summation of all weighting factors is normalized to be one, i.e., $$\sum_{i=0}^{N} w_i = 1.$$

Based on this, the desired cooking setting parameters can be determined with a continuous function of the food temperature range, wherein the food temperature range is defined by a numerical value. In the same way as the soft determination at cooking setting level, the impact of improper categorization on the final cooking outcome can be alleviated.

Experimental Evidence

Test 1: Quadruple Versus Binary Temperature Categorization

In the first experiment, a comparison of the cooking outcome is made between binary and quadruple initial temperature categorizations. French fries are chosen as the test food and a Philips air fryer as the cooking platform (heating temperature 200° C.).

300 gram of French fries are taken out of the freezer and left at room temperature overnight. The average temperature (surface and core) is 20° C. The binary categorization categorizes the fries as non-frozen, on which basis an average cooking time of 14 minutes is assigned, whereas the quadruple categorization categorizes the fries as 'room temperature' and accordingly assigns a cooking time of 12 minutes. The results of frying demonstrate that the quadruple scheme results in fries of the proper doneness (light brown), compared to the binary scheme which results in apparently over-fried fries (some fries even being burned).

Test 2: Quadruple Temperature Categorization with Soft Cooking Setting Determination In the second experiment, 500 gram of frozen French fries are left at room temperature for ~45 minutes, and the measured average temperature (surface and core) is 3.5° C. (range 'partially defrosted'). With the quadruple categorization, the probabilities (or confidence indices) of all 4 ranges are given as 'frozen': probability 0.14;
'partially defrosted': probability 0.39;
'defrosted but cold': probability 0.47; (which will be considered as the result of hard decision based on the maximum probability)
'room temperature': probability 0.0.

The fries are categorized improperly as 'defrosted but cold' based on hard decision, which results in a cooking time of 14.5 minutes (Table 1).

The soft determination (weighted summation, equation (3)), however, calculates the cooking time as $$CS=14.5*0.47+18*0.14+16*0.39+13*0.0 \approx 15.6 \text{ minutes.}$$

Frying based on the hard decision-determined cooking time leads to under-fried French fries (pale), whereas the proposed method results in a more proper doneness (light brown).

The invention also proposes a cooking apparatus for controlling the process for cooking food, the cooking apparatus comprising: a detecting unit for detecting an initial temperature of the food; an evaluating unit for evaluating weighting factors of more than one temperature ranges according to the initial temperature, the more than one temperature ranges and preset cooking parameters of each of the more than one temperature ranges being predetermined; and a controlling unit for controlling the cooking process based on the evaluated weighting factors and the preset cooking parameters.

The cooking setting (temperature, time etc) can thus be determined based on the detected temperature ranges as well as the eliminated temperature ranges. This will tackle the ambiguity issue of the food's initial status mentioned above, and alleviate the impact of possible detection inaccuracy on the cooking outcome as well.

Preferably, the more than one temperature ranges are continuous without overlap. With such a configuration, the more than one temperature ranges are able to cover most of the possible initial temperatures of the food.

In a preferred embodiment of the invention, the controlling unit is further configured for: calculating the product of each preset cooking parameter and a corresponding evaluated weighting factor; and controlling the cooking process by summation of the calculated products.

By calculating the product of each preset cooking parameter and a corresponding evaluated weighting factor, the preset cooking settings corresponding to more than one temperature ranges contribute to the final cooking setting, which all have likelihood of being the actual one above a pre-defined threshold. It alleviates the effect of improper categorization, compared to a 'hard' determination method where a determined cooking setting can be significantly off if an incorrect range is chosen.

Preferably, the controlling unit is further configured for: assigning different numerical values to the more than one temperature ranges; calculating the product of each numerical value and a corresponding evaluated weighting factor; and controlling the cooking process by summation of the products and a continuous cooking parameter function with respect to temperature.

Based on this, the desired cooking setting parameters can be determined with a continuous function of the food temperature range, wherein the food temperature range is defined by a numerical value. It also alleviates the effect of improper categorization, compared to a 'hard' determination method where a determined cooking setting can be significantly off if an incorrect range is chosen.

In another preferred embodiment of the invention, the controlling unit is configured for controlling at least one of: cooking temperature, cooking time, cooking humidity and cooking pressure during the cooking process.

As can be understood by those skilled in the art, a cooking setting comprises at least one of: cooking temperature, cooking time, cooking humidity and cooking pressure during the cooking process. The cooking setting can thus be determined according to the method of the various embodiments of the invention and also based on the particular setting of the cooking apparatus in use.

Preferably, at least one of the more than one temperature ranges is above 0° C. As will be discussed in detail below, fewer ranges lead to fewer detection errors, but may result in a substantial deviation from the desired cooking doneness when a detection error occurs. Therefore, by predetermining more than one temperature ranges above 0° C., more accurately evaluated weighting factors and thus an optimal cooking setting parameter can be achieved.

Preferably, the detecting unit is configured for: measuring the initial temperature of the food based on the moisture loss rate of the food during the cooking process. By means of measuring the moisture loss rate of the food, the initial temperature of the food can be detected more precisely, since the moisture loss rate is linked closely to the temperature of the food, especially when the temperature of the food is above 0° C.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of controlling a process for cooking food having a cooking parameter dependent on an initial temperature of the food to be cooked, the method comprising the steps of:
    detecting the initial temperature of the food;
    determining a state of said food based on the initial temperature of said food;
    determining, from the state of said food, a plurality of food state categories, wherein each of said plurality of food state categories is associated with a temperature range and each of said plurality of temperature ranges having a preset cooking parameter;
    obtaining probabilities associated with each of said determined plurality of food state categories, wherein said probabilities represent a likelihood of said state of said food being in one of the plurality of food state categories;
    obtaining said preset cooking parameters associated with each of said determined plurality of food state categories;
    determining a cooking time of said food based on a combination of the obtained probabilities for each of said plurality of food state categories and said obtained preset cooking parameters for each of said plurality of food state categories; and
    controlling the cooking process based on the determined cooking time.

2. The method of claim 1, wherein the plurality of temperature ranges are continuous without overlap.

3. The method of claim 1, wherein the step of determining a cooking time comprises:
    calculating a product of each of said preset cooking parameters and a corresponding probability; and
    summing the calculated products.

4. The method of claim 1, wherein the step of determining a cooking time comprises:
    assigning different numerical values to the plurality of temperature ranges;
    calculating a product of each numerical value and a corresponding probability; and
    summing said products and a continuous cooking parameter function with respect to temperature.

5. The method of claim 4, further comprises:
    generating the continuous cooking parameter function with respect to the temperature based on the preset cooking parameters and the plurality of temperature ranges.

6. The method of claim 1, wherein the step of controlling the cooking process comprises:
    controlling at least one of: a cooking temperature, a cooking time, a cooking humidity, and a cooking pressure during the cooking process.

7. The method of claim 1, wherein at least one of the plurality of temperature ranges is above 0° C.

8. The method of claim 1, wherein the step of detecting an initial temperature comprises:
    estimating the initial temperature of the food based on a measurement of a moisture loss rate of the food during the cooking process.

9. The method of claim 1, wherein the plurality of food state categories comprises one or more of a partially frozen, a defrosted, a defrosted but cold, and at a room temperature.

10. The method of claim 1, wherein the plurality of food state categories is determined based on a surface temperature, a core temperature, and an average temperature of the food.

11. The method of claim 10, wherein the average temperature is determined based on the surface temperature and the core temperature.

12. An apparatus for cooking food having a cooking parameter dependent on an initial temperature of the food to be cooked, the cooking apparatus comprising:
    a detector configured to detect the initial temperature of the food;
    an evaluator configured to:
        determine a state of said food based on the initial temperature of said food;
        determine, from the state of said food, a plurality of food state categories, wherein each of said plurality of food state categories being associated with a temperature range and each of said plurality of temperature ranges having a preset cooking parameter;

obtain probabilities associated with each of said determined plurality of food state categories, wherein said probabilities represent a likelihood said state of said food is in one of the plurality of food state categories; and obtain the preset cooking parameters associated with each of said determined plurality of food state categories; and a controller configured to:

determine a cooking time of said food based on a combination of said obtained probabilities for each of the plurality of food state categories and said obtained preset cooking parameters for each of the plurality of food state categories; and control the cooking process based on the determined cooking time.

13. The cooking apparatus of claim 12, wherein the plurality of temperature ranges are continuous without overlap.

14. The cooking apparatus of claim 12, wherein the controller is further configured to:

calculate a product of each of said preset cooking parameters and a corresponding probability; and control the cooking process by summation of the calculated products.

15. The cooking apparatus of claim 12, wherein the controller is further configured to:

assign different numerical values to the plurality of temperature ranges;

calculate a product of each numerical value and a corresponding probability; and control the cooking process by summation of the products and a continuous cooking parameter function with respect to temperature.

16. The cooking apparatus of claim 15, wherein the controller is further configured to:

control at least one of: a cooking temperature, a cooking time, a cooking humidity and a cooking pressure during the cooking process.

17. The cooking apparatus of claim 12, wherein at least one of the plurality of temperature ranges is above 0° C.

18. The cooking apparatus of claim 12, wherein the detector is further configured to:

estimate the initial temperature of the food based on a measurement of a moisture loss rate of the food during the cooking process.

* * * * *